(12) United States Patent
Bozak et al.

(10) Patent No.: US 7,703,029 B2
(45) Date of Patent: Apr. 20, 2010

(54) GRID BROWSER COMPONENT

(75) Inventors: Erol Bozak, Pforzheim (DE);
Alexander Gebhart, Bad Schoenborn (DE)

(73) Assignee: SAP AG, Walldorf (DE)

( * ) Notice: Subject to any disclaimer, the term of this patent is extended or adjusted under 35 U.S.C. 154(b) by 1351 days.

(21) Appl. No.: 10/712,886

(22) Filed: Nov. 12, 2003

(65) Prior Publication Data

US 2005/0027813 A1   Feb. 3, 2005

Related U.S. Application Data

(60) Provisional application No. 60/490,818, filed on Jul. 28, 2003.

(51) Int. Cl.
*G06F 3/048* (2006.01)
*G06F 15/173* (2006.01)

(52) U.S. Cl. ........................ 715/764; 709/226

(58) Field of Classification Search ................. 715/514
See application file for complete search history.

(56) References Cited

U.S. PATENT DOCUMENTS

| | | | |
|---|---|---|---|
| 5,276,789 A * | 1/1994 | Besaw et al. ............... 345/440 |
| 5,440,722 A | 8/1995 | VanderSpek et al. | |
| 5,539,883 A | 7/1996 | Allon et al. | |
| 5,572,724 A | 11/1996 | Watanabe et al. | |
| 5,659,694 A | 8/1997 | Bibayan | |
| 5,699,532 A | 12/1997 | Barrett et al. | |
| 5,761,429 A * | 6/1998 | Thompson ................. 709/224 |
| 5,784,552 A | 7/1998 | Bishop et al. | |
| 5,996,012 A | 11/1999 | Jarriel | |
| 6,009,455 A | 12/1999 | Doyle | |
| 6,061,505 A | 5/2000 | Pitchaikani et al. | |
| 6,098,108 A | 8/2000 | Sridhar et al. | |
| 6,182,086 B1 | 1/2001 | Lomet et al. | |
| 6,209,018 B1 | 3/2001 | Ben-Shachar et al. | |

(Continued)

FOREIGN PATENT DOCUMENTS

JP      05-216845      8/1993

(Continued)

OTHER PUBLICATIONS

Special Edition using Microsoft Excel 2000. Copyright 1999 by Que Corpl , p. 67-68.*

(Continued)

*Primary Examiner*—Doug Hutton
*Assistant Examiner*—Soumya Dasgupta
(74) *Attorney, Agent, or Firm*—Finnegan, Henderson, Farabow, Garrett & Dunner L.L.P.

(57) ABSTRACT

A graphical user interface (GUI) includes a graph with vectors and nodes for visualizing a computer grid, the nodes representing computers running grid managers and the vectors representing relations between pairs of grid managers, each of the relations defining a first grid manager to be superior to a second grid manager and a vector points from a node representing the first grid manager to a node representing the second grid manager. The GUI also includes, for each node, an expandable structure showing computer grid applications running on a computer represented by the node, and an event handler configured to receive a request to view management services running on a computer and to generate a display showing the management services running on the computer.

16 Claims, 8 Drawing Sheets

U.S. PATENT DOCUMENTS

| | | | |
|---|---|---|---|
| 6,226,675 | B1 | 5/2001 | Meltzer et al. |
| 6,256,740 | B1 | 7/2001 | Muller et al. |
| 6,289,382 | B1 | 9/2001 | Bowman-Amuah |
| 6,385,639 | B1 | 5/2002 | Togawa |
| 6,401,097 | B1 | 6/2002 | McCotter et al. |
| 6,453,349 | B1 | 9/2002 | Kano et al. |
| 6,466,980 | B1 | 10/2002 | Lumelsky et al. |
| 6,502,131 | B1* | 12/2002 | Vaid et al. .................... 709/224 |
| 6,615,278 | B1 | 9/2003 | Curtis |
| 6,628,304 | B2 | 9/2003 | Mitchell et al. |
| 6,650,347 | B1* | 11/2003 | Nulu et al. .................. 715/853 |
| 6,751,795 | B1 | 6/2004 | Nakamura |
| 6,775,830 | B1 | 8/2004 | Matsunami et al. |
| 6,789,170 | B1 | 9/2004 | Jacobs et al. |
| 6,799,251 | B1 | 9/2004 | Jacobs et al. |
| 6,826,568 | B2 | 11/2004 | Bernstein et al. |
| 6,832,220 | B1 | 12/2004 | Rahman |
| 6,834,301 | B1* | 12/2004 | Hanchett .................... 709/223 |
| 6,859,834 | B1 | 2/2005 | Arora et al. |
| 6,912,587 | B1 | 6/2005 | O'Neil |
| 6,967,728 | B1 | 11/2005 | Vidyanand |
| 6,976,258 | B1 | 12/2005 | Goyal et al. |
| 7,010,596 | B2 | 3/2006 | Bantz et al. |
| 7,051,107 | B2 | 5/2006 | Morikawa |
| 7,096,248 | B2 | 8/2006 | Masters et al. |
| 7,130,891 | B2 | 10/2006 | Bernardin et al. |
| 7,171,470 | B2 | 1/2007 | Doyle et al. |
| 7,171,654 | B2 | 1/2007 | Werme et al. |
| 7,181,743 | B2 | 2/2007 | Werme et al. |
| 7,185,046 | B2 | 2/2007 | Ferstl et al. |
| 7,234,032 | B2 | 6/2007 | Durham et al. |
| 7,322,031 | B2 | 1/2008 | Davis et al. |
| 7,328,406 | B2 | 2/2008 | Kalinoski et al. |
| 2001/0049594 | A1* | 12/2001 | Klevans ....................... 703/14 |
| 2001/0054034 | A1 | 12/2001 | Arning et al. |
| 2002/0019844 | A1 | 2/2002 | Kurowski et al. |
| 2002/0167954 | A1* | 11/2002 | Highshmith et al. .......... 370/406 |
| 2002/0194251 | A1 | 12/2002 | Richter et al. |
| 2003/0003068 | A1 | 1/2003 | Nickel et al. |
| 2003/0005068 | A1 | 1/2003 | Nickel et al. |
| 2003/0033369 | A1 | 2/2003 | Bernhard |
| 2003/0041130 | A1 | 2/2003 | Harrisville-Wolff et al. |
| 2003/0041142 | A1* | 2/2003 | Zhang et al. ................ 709/224 |
| 2003/0088580 | A1 | 5/2003 | Desai et al. |
| 2003/0093528 | A1 | 5/2003 | Rolia |
| 2003/0101331 | A1* | 5/2003 | Boylan et al. ................. 712/36 |
| 2003/0126196 | A1 | 7/2003 | Lagimonier et al. |
| 2003/0126265 | A1 | 7/2003 | Aziz et al. |
| 2003/0197726 | A1 | 10/2003 | Weitzman |
| 2004/0179481 | A1* | 9/2004 | Graupner ..................... 370/254 |
| 2004/0194084 | A1 | 9/2004 | Matsunami et al. |
| 2004/0215590 | A1 | 10/2004 | Kroening |
| 2004/0215973 | A1 | 10/2004 | Kroening |
| 2004/0225711 | A1 | 11/2004 | Burnett et al. |
| 2004/0255291 | A1 | 12/2004 | Sierer et al. |
| 2004/0261053 | A1 | 12/2004 | Dougherty et al. |
| 2004/0268147 | A1* | 12/2004 | Wiederin et al. ............. 713/201 |
| 2004/0268293 | A1 | 12/2004 | Woodgeard |
| 2005/0015437 | A1 | 1/2005 | Strait |
| 2005/0015643 | A1 | 1/2005 | Davis et al. |
| 2005/0027785 | A1 | 2/2005 | Bozak et al. |
| 2005/0027812 | A1 | 2/2005 | Bozak et al. |
| 2005/0027843 | A1 | 2/2005 | Bozak et al. |
| 2005/0027864 | A1 | 2/2005 | Bozak et al. |
| 2005/0027865 | A1 | 2/2005 | Bozak et al. |
| 2005/0044251 | A1 | 2/2005 | Bozak et al. |
| 2005/0060272 | A1 | 3/2005 | Lin |
| 2005/0076105 | A1 | 4/2005 | Keohane et al. |
| 2005/0076339 | A1 | 4/2005 | Merril et al. |
| 2005/0131898 | A1* | 6/2005 | Fatula ............................ 707/8 |
| 2005/0138156 | A1 | 6/2005 | Gebhart et al. |
| 2005/0138618 | A1 | 6/2005 | Gebhart |
| 2005/0149294 | A1 | 7/2005 | Gebhart |
| 2005/0160107 | A1 | 7/2005 | Liang |
| 2005/0160423 | A1 | 7/2005 | Bantz et al. |
| 2005/0165912 | A1 | 7/2005 | Colbeck et al. |
| 2005/0235055 | A1 | 10/2005 | Davidson |
| 2006/0005181 | A1 | 1/2006 | Fellenstein et al. |
| 2006/0015285 | A1 | 1/2006 | Fuller et al. |
| 2006/0075070 | A1 | 4/2006 | Merissert-Coffinieres et al. |
| 2006/0136506 | A1 | 6/2006 | Gebhart et al. |
| 2006/0168158 | A1 | 7/2006 | Das |
| 2006/0168174 | A1 | 7/2006 | Gebhart et al. |
| 2006/0294238 | A1 | 12/2006 | Naik et al. |
| 2008/0052729 | A1 | 2/2008 | Paul et al. |

FOREIGN PATENT DOCUMENTS

| | | |
|---|---|---|
| JP | 07-311743 | 11/1995 |
| JP | 08314872 | 11/1996 |
| JP | 2000-078156 | 3/2000 |
| JP | 2002-528797 | 9/2002 |
| JP | 2004-508616 | 3/2004 |
| WO | WO 01/13227 A2 | 2/2001 |
| WO | WO 02/03203 A2 | 1/2002 |

OTHER PUBLICATIONS

"Intro to Grid Computing with Globus." IBM Redbooks—file: sg246895. Copyright Sep. 2003.*

Ting et al. "3LS: A Peer-to-Peer Network Simulator." Copyright Sep. 2003.*

International Search Report for PCT/EP2004/008409.

Czajkowski et al., "Grid Information Services for Distributed Resource Sharing," Proceedings 10th IEEE International Symposium on High Performance Distributed Computing., pp. 1-14, Aug. 2001.

Wäänänen, et al., "An Overview of an Architecture Proposal for a High Energy Physics Grid," Applied Parallel Computing, Advanced Scientific Computing, 6th international Conference, pp. 76-86, Jun. 2002.

Lee et al., "*visPerf*: Monitoring Tool for Grid Computing," Retrieved from the Internet: http://icl.cs.utk.edu/projectsfiles/netsolve/pubs/visperf.pdf, pp. 1-13, Jun. 2003.

Allcock, et al., "GridMapper: A Tool for Visualizing the Behavior of Large-Scale Distributed Systems," Proceedings 11th IEEE International Symposium on High Performance Distributed Computing IEEE Comput. Soc Piscataway, NJ, pp. 179-167, Jul. 2002.

Tierney, et al., White Paper: A Grid Monitoring Service Architecture (DRAFT), Retrieved from the internet http://citeseer.ist.psu.edu/530951.htm, Feb. 2001.

Von Laszewski, et al., "Designing Grid-based Problem Solving Environments and Portals," Proceedings of the 34th Annual Hawaii International Conference on System Sciences IEEE Comput. Soc Los Alamitos, CA, pp. 1-10, Jan. 2001.

Foster, Ian et al. "*The Anatomy of the Grid*". Enabling Scalable Virtual Organizations. Argonne National Library, Argonne, IL; University of Chicago, Chicago, IL. University of Southern California, Marina del Rey, CA. 2001.

"Caching In on the Enterprise Grid Turbo-Charge Your Applications with OracleAS Web Cache," An Oracle Technical White Paper, <<http://www.oracle.com/technology/products/ias/web_cache/pdf/WebCache1012_twp.pdf>>, Feb. 7, 2006, pp. 1-34.

"eserver xSeries 335 Type 8676 User's Guide," Feb. 2003, IBM Product User's Guide, Chapter 1, pp. 1-12.

Berstis, V., "Fundamentals of Grid Computing," IBM Redbooks—file: redp6313. Copyright Nov. 2002, pp. 1-28.

"hp blade server data sheet," HP Blade Server Data Sheet, Nov. 2001, pp. 1-6.

"IBM eserver xSeries 335," IBM Data Sheet, Publication date unknown, IBM Data Sheet, accessed online on Dec. 27, 2004 at <http://www.ibm.com/servers/uk/eserver/xseries/literature/xseries_335.html>, 2 pages.

Allen, et al., "The Cactus Worm: Experiments With Dynamic Resource Discovery and Allocation in a Grid Environment," International Journal of High Performance Computing Applications Sage Science Press, vol. 15, No. 4, pp. 345-358, 2001.
Baldridge, Kim K. et al., "QMView and GAMESS: Integration into the World Wide Computational Grid," IEEE, pp. 1-25, 2002.
Berman et al., "The GrADS Project: Software Support for High-Level Grid Application Development," International Journal of High Performance Computing Applications, Sage Science Press, vol. 15, No. 4, pp. 327-344, Jul. 31, 2001.
Braden, R. et al., "Resource ReSerVation Protocol (RSVP), Version 1 Functional Specification," Aug. 12, 1996, pp. 1-100.
Cactus 4.0, User's Guide, Rev. 1.45, Chapter D9, dated Jan. 19, 2004 (3 pages).
Chase, Jeffrey S., et al., "Dynamic Virtual Clusters in a Grid Site Manager," High Performance Distributed Computing, 2003, Proceedings 12th IEEE International Symposium on Jun. 22-24, 2003, 12 pgs.
Liu, C. et al., "Design and Evaluation of a Resource Selection Framework for Grid Applications," High Performance Distributed Computing 2002, HPDC-11, 2002, Proceedings 11th IEEE International Symposium, Jul. 23-26, 2002, 10 pgs.
Czajkowski, Karl et al., "Resource Co-Allocation in Computational Grid: High-Performance Distributed Computing Archive," Proceedings of the 8th IEEE International Symposium on High Performance Distributed Computing Table of Contents, 1999, 14 pgs.
Dubinsky et al., "A Flexible Rerouting Protocol in ATM Networks," IEEE Infocom '99, Conference on Computer Communications, Proceedings, 18th Annual Joint Conference of the IEEE Computer and Communications Societies, vol. 3, pp. 1488-1496, Mar. 1999.
El-Ghazawi, Tarek et al., "A Performance Study of Job Management Systems," Oct. 2004, 10 pgs.
European Examination Report, dated Aug. 1, 2007, for corresponding EP Application No. 05 027 222.8 (5 pages).
European Search Opinion, dated May 18, 2006, for corresponding EP Application No. 05 027 222.8 (5 pages).
European Search Report dated Mar. 1, 2006 pertaining to Application No. 05027221.0—2211, 10 pgs.
European Search Report for Application No. 05027222.8, dated May 18, 2006 (9 pages).
Foster, Ian et al., "A Distributed Resource Management Architecture that Supports Advance Reservations and Co-allocation," IEEE 1999, pp. 27-36.
Foster, Ian et al., "The Anatomy of the Grid: Enabling Scalable Virtual Organizations," The International Journal of High Performance Computing Applications, vol. 5, No. 3, Fall 2001, pp. 1-23.
Laszewski, G., et al., "CoG Kits: A Bridge Between Commodity Distributed Computing and High-Performance Grids," Retrieved from the Internet: http://www-unix.mcs.anl.gov, Jun. 2000, pp. 97-105.
Goodale et al., "Checkpoint/Recovery in Cactus 4.0," Oct. 16, 2002 (7 pages).
International Search Report for PCT/EP2004/008406, Dec. 28, 2004, 7 pgs.
International Search Report for PCT/EP2004/008407, Jan. 19, 2005, 6 pgs.
International Search Report for PCT/EP2004/008408, Mar. 21, 2005, 16 pgs.
International Search Report for PCT/EP2004/008409, Dec. 29, 2004, 6 pgs.
International Search Report for PCT/EP2004/008448, Jan. 19, 2005, 7 pgs.
International Search Report for PCT/EP2004/008449, Jan. 19, 2005, 6 pgs.
Jang et al., "A Path Based Internet Cache Design for GRID Application," Lecture Notes in Computer Science, Dec. 2003, pp. 455-458.
Konya, B., "The NorduGrid Information System," Retrieved from the Internet: http://www.nordugrid.org, Sep. 16, 2002, 14 pgs.
Konya, B., et al., "The NorduGrid Architecture and Tools," Retrieved from the Internet: http://www.nordugrid.org, Mar. 2002, 5 pgs.
Limaye, K. et al., "Reliability-aware Resource Management for Computational Grid/Cluster environments," IEEE 2005, pp. 211-218.
Liu, et al., "Design and Evaluation of a Resource Selection Framework for Grid Applications," Proceedings 11th IEEE International Symposium on High Performance Distributed Computing IEEE Comput. Soc., Piscataway, NJ, Jul. 2002 10 pgs.
Nabrzyski Jared et al., "Grid Resource Management, State of the Art and Future Trends," Sep. 2003, Kluwer Academic Publishers, 44 pgs.
Rajkumar Buyya; Nimrod/G., "An Architecture for a Resource Management and Scheduling System in a Global Computational Grid," IEEE Computer Society Press, USA, 2000, pp. 1-7.
Rajkumar, Buyya, "Economic-based Distributed Resource Management and Scheduling for Grid Computing," Apr. 2002, 180 pgs.
Schopf et al., Jennifer M., "Grid Resource Management: State of the Art and Future Trends," [Online] Sep. 2003, Retrieved from the Internet: URL:http://www-unix.mcs.anl.gov/schopf.BookFinal.pdf> [retrieved on May 10, 2007], 44 pgs.
Sgaravatto et al., "Grid Checkpointing in the European DataGrid Project," Oct. 16, 2002 (3 pages).
U.S. Appl. No. 12/326,441, filed Dec. 2, 2008 entitled "Grid Organization," 29 pgs.
von Laszewski et al., "InfoGram: A Grid Service that Supports Both Information Queries and Job Execution," 2002, pp. 333-342, IEEE Computer Society, Proceedings of the 11th IEEE International Symposium on High Performance Distributed Computing, (HPDC '02), 10 pgs.
von Laszewski, et al., "Grid-Based Asynchronous Migration of Execution Context in Java Virtual Machines," Euro-Par 2000 Parallel Processing, 6th International Euro-Par Conference Proceedings, Lecture Notes in Computer Science, vol. 1900, pp. 22-34, Sep. 2000.
Walsh, et al., "Staged Simulation for Improving Scale and Performance of Wireless Network Simulations," Institute of Electrical and Electronics Engineers, Proceedings of the 2003 Winter Simulation Conference, New Orleans, Dec. 7-10, 2003, IEEE, vol. 2 of 2, pp. 667-675.
Zhang et al., "Fault-tolerant Grid Services Using primary-Backup: Feasibility and Performance," Cluster Computing, 2004 IEEE International Conference, San Diego, CA Sep. 20-23, 2004, pp. 105-114.
Ali et al., "Predicting the Resource Requirements of a Job Submission," California Institute of Technology, pp. 1-4, 2004.
European Search Report dated Mar. 13, 2006 pertaining to Application No. 05027543.7—2211, 7 pages.
Li et al., "Improving Performance via Computational Replication on a Large-Scale Computational Grid," Proceedings of the 3rd IEEE/ACM International Symposium on Cluster Computing and the Grid, 2003, pp. 1-7.
Vadhiyar et al., "A Performance Oriented Migration Framework for the Grid," Proceedings of the Third IEEE/ACM International Symposium on Cluster Computing and the Grid IEEE Comput. Soc., Los Alamitos, CA, pp. 130-137, May 2003.
"How Sun™ Grid Engine, Enterprise Edition 5.3 Works," Policy Systems in Sun Grid Engine, Enterprise Edition 5.3 Software, 1-16 (Nov. 2001).
"Sun Cluster Grid Architecture," Sun Microsystems, Inc. 1-42 (2002).
"Sun's Grid Computing Solutions Outdistance the competition," Aberdeen Group, Inc. 1-20 (May 2002).
Berstis, Viktors. "Fundamentals of Grid Computing," IBM Corporation, Redbooks Paper, 1-28 (2002).
Berstis, Viktors. "Fundamentals of Grid Computing," IBM Corporation, Redboolcs Paper, 1-28 (2002).
Ferreira, et al., "Introduction to Grid Computing with Globus," IBM Corporation, Redbooks, 2nd Edition, 1-268, (2003).
Ferreira, et al., "Grid computing with the IBM Grid Toolbox," IBM Corporation, Redbooks, Draft, 1-281, Review (Apr. 12, 2004).
Goyal, Brajesh, "Oracle and the Grid," An Oracle White Paper, Oracle Corporation, 1-15 (Nov. 2002).
Injey, Franck. "External Time Reference (ETR) Requirements on z990," IBM Corporation, Redbooks Flash, 1-20 (2004).
Lacan, Francis. "A Perfect World? A model for transformation," IBM Business Consulting Services, 1-12, (Apr. 2003).
Min, et al. "A CICS to Linux Grid Implementation," IBM Corporation, Redbooks Paper, 1-24 (2003).
Smith, Gordon, "Oracle RAC 10g Overview," *An Oracle White Paper*, Oracle Corporation, 1-15 (Nov. 2003).
Soulder, Benny. "On The Grid," Oracle Corporation, 1-4 (2004).

Jitsumori, Hitoshi, "Beginning of the Grid Computing Era," Nikkei Internet Solutions, vol. 69, pp. 81-89, Nikkei Business Publications, Inc., Mar. 22, 2003.

Jitsumori, Hitoshi, "Concentrated Control of a Plurality of Computers as One System," Nikkei Internet Technology, vol. 59, p. 14-15, Nikkei Business Publications, Inc., May 22, 2002.

Official Notice of Rejection mailed on Apr. 10, 2009 for Japanese Patent Application No. 2006-521509 (2 pages), and translation thereof (3 pages).

Official Notice of Rejection mailed on Apr. 14, 2009 for Japanese Patent Application No. 2006-521512 (5 pages), and translation thereof (6 pages).

Official Notice of Rejection mailed on Apr. 21, 2009 for Japanese Patent Application No. 2006-521513 (2 pages), and translation thereof (3 pages).

Official Notice of Rejection mailed on Apr. 24, 2009 for Japanese Patent Application No. 2006-521515 (3 pages), and translation thereof (4 pages).

"Grid Computing Q&A with Benny Souder, Vice President, Distributed Database Development, Database and Application Server Technologies," May 22, 2003, pp. 1-9.

About Grid computing [online]. IBM, [retrieved on Apr. 14, 2001]. Retrieved from the Internet: http://www-1.ibm.com/grid/about_grid/index.shtml. 1 page.

FAQ [online]. IBM, [retrieved on Apr. 14, 2004]. Retrieved from the Internet: http://www-1.ibm.com/grid/about grid/faq.shtml. 4 pages.

Grid Benefits [online]. IBM, [retrieved on Apr. 14, 2004]. Retrieved from the Internet: http://www-1.ibm.com/grid/about grid/benefits.shtml. pp. 1-2.

IBM and grid: E-business on demand [online]. IBM, [retrieved on Apr. 14, 2004]. Retrieved from the Internet: http://www-1.ibm.com/grid/about grid/ibm grid/ebod.shtml. 1 page.

IBM and grid: How IBM is using grid [online]. IBM, [retrieved on Apr. 14, 2004]. Retrieved from the Internet: http://www-1.ibm.com/grid/about grid/ibm grid/grid today.shtml. 1 page.

IBM and grid: Open standards [online]. IBM, [retrieved on Apr. 4, 2004]. Retrieved from the Internet: http://www-1.ibm.com/grid/about grid/ibm grid/open standards.shtml. 1 page.

IBM and grid: Overview [online]. IBM, [retrieved on Apr. 14, 2004]. Retrieved from the Internet: http://www-1.ibm.com/grid/about grid/ibm grid/index.shtml. 1 page.

IBM and grid: Products and services [online]. IBM, [retrieved on Apr. 14, 2004]. Retrieved from the Internet: http://www-1.ibm.com/grid/about grid/ibm grid/products services.shtml. 2 pages.

IBM and grid: Strategic relationships [online]. IBM, [retrieved on Apr. 14, 2004]. Retrieved from the Internet: http://wvvw-1.ibm.com/grid/about grid/ibm grid/strategic relation.shtml. 1 page.

IBM Grid computing [online]. IBM, [retrieved on Apr. 14, 2004]. Retrieved from the Internet: http://www-1.ibm.com/linux/grid/. 1 page.

Oracle Grid Computing Technologies [online]. Oracle, [retrieved on Apr. 15, 2004]. Retrieved from the Internet: http://otn.oracle.com/products/oracle9i/grid computing/index.html. 2 pages.

What is grid computing [online]. IBM, [retrieved on Apr. 14, 2004]. Retrieved from the Internet: http://www1.ibm.com/grid/about grid/what is.shtml. 1 page.

Vadhiyar et al., "A Performance Oriented Migration Framework for the Grid," Proceedings of the Third IEEE/ACM International Symposium on Cluster Computing and the Grid IEEE Comput. Soc., Los Alamitos, CA, pp. 130-137, May 2003.

Zenses, Ralf, "N1 Grid Advanced Architecture for SAP Operating concept for SAP Infrastructure," Germany/Austria Sun Microsystems GmbH, Mar. 5, 2004, pp. 1-34.

Beiriger, Judy et al., "Constructing the ASCI Computational Grid," 2000, p. 193-9, IEEE Comput. Soc., Los Alamitos, CA.

Berman, Fran et al., "Application-Level Scheduling on Distributed Heterogeneous Networks (Technical Paper)," Proceedings of Supercomputing '96, 1996, Article No. 39, pp. 1-28, University of California - San Diego, La Jolla, CA.

Czajkowski, Karl et al., "A Resource Management Architecture for Metacomputing Systems," 1998, vol. 1459, pp. 62-82, University of Southern California, Marina del Rey, CA; Mathematics and Computer Science Division, Argonne, IL.

Czajkowski, Karl et al, "Grid Information Services for Distributed Resource Sharing," 2001, pp. 181-194, IEEE Comput. Soc., Los Alamitos, CA.

Ferris, Michael et al., "NEOS and CONDOR: Solving Optimization Problems Over the Internet," CRPC-TR98763-S, Mar. 1998, pp. 1-18, Rice University, Houston, TX.

Foster, Ian et al., "A Grid-Enabled MPI: Message Passing in Heterogeneous Distributed Computer System," 1998, p. 15, IEEE Comput. Soc., Los Alamitos, CA.

Foster, Ian et al., "A Quality of Service Architecture that Combines Resource Reservation and Application Adaptation," 2000, pp. 181-188, IEEE, Piscataway, NJ.

Foster, Ian et al., "The Physiology of the Grid," 2002, An Open Grid Services Architecture for Distributed Systems Integration, pp. 1-31, Argonne National Laboratory, Argonne, IL; University of Chicago, Chicago, IL; University of Southern California, Marina del Rey, CA; IBM Corporation, Poughkeepsie, NY.

Frey, James et al., "Condo-G: A Computation Management Agent for Multi-Institutional Grids," 2002, vol. 5, No. 3, pp. 237-246, Kluwer Academic Publishers, Netherlands.

Goteti, Srikanth et al., "Communication Pattern Based Node Selection for Shared Networks," 2003, pp. 69-76, IEEE Comput. Soc., Los Alamitos, CA.

Goux, Jean Pierre et al., "An Enabling Framework for Master-Worker Applications on the Computational Grid," 2000, pp. 43-50, IEEE Computer Soc., Los Alamitos, CA.

Litzkow, Michael J. et al., "Condor - A Hunter of Idle Workstations," 1988, pp. 104-111, 8th International Conference on Distributed Computing Systems, San Jose, CA.

Lowekamp, Bruce et al., "A Resource Query Interface for Network-Aware Applications," 1999, vol. 2, No. 2, pp. 139-151, Baltzer, Netherlands.

Papakhian, Mary et al., "Comparing Job-Management Systems: The User's Perspective," Apr.-Jun. 1998, vol. 5, No. 2, pp. 4-9, Technology News and Reviews, IEEE Computational Science & Engineering.

Sandholm, Thomas et al., "Java OGSI Hosting Environment Design A Portable Grid Service Container Framework," 2002, pp. 1-20, Argonne National Laboratory, IBM Poughkeepsie, NY.

Open Grid Services Infrastructure (OGSI), "Open Grid Services Infrastructure (OGSI) Version 1.0, " Global Grid Forum, Jun. 27, 2003 (86 pages).

Official Notice of Rejection mailed on Aug. 11, 2009 of Japanese Patent Application No. 2006-521512, (2 pages) and translation thereof (2 pages).

* cited by examiner

GRID BROWSER COMPONENT

CROSS-REFERENCE TO RELATED APPLICATIONS

This application incorporates by reference the content of U.S. Provisional Application No. 60/490,818, Express Mail Number, EV 331001684 US, filed Jul. 28, 2003, to Erol Bozak et al., entitled GRID COMPUTING MANAGEMENT.

TECHNICAL FIELD

The present invention relates to data processing by digital computer, and more particularly to a user interface for browsing a grid computing environment.

BACKGROUND

In today's data centers, the clusters of servers in a client-server network that run business applications often do a poor job of managing unpredictable workloads. One server may sit idle, while another is constrained. This leads to a "Catch-22" where companies, needing to avoid network bottlenecks and safeguard connectivity with customers, business partners and employees, often plan for the highest spikes in workload demand, then watch as those surplus servers operate well under capacity most of the time.

In grid computing, all of the disparate computers and systems in an organization or among organizations become one large, integrated computing system. That single integrated system can then handle problems and processes too large and intensive for any single computer to easily handle in an efficient manner.

More specifically, grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can mean reduced cost of ownership, aggregated and improved efficiency of computing, data, and storage resources, and enablement of virtual organizations for applications and data sharing.

SUMMARY

In one aspect, the invention features a graphical user interface (GUI) that includes a graph with edges and vertices, the vertices representing grid nodes and the edges representing an association of two grid nodes in a grid computing network.

Embodiments may include one or more of the following. The association is peer-to-peer. The association is hierarchical.

In another aspect, the invention features a graphical user interface (GUI) that includes a graph with vectors and nodes for visualizing a computer grid, the nodes representing computers running grid managers and the vectors representing relations between pairs of grid managers, each of the relations defining a first grid manager to be superior to a second grid manager and a vector points from a node representing the first grid manager to a node representing the second grid manager. The GUI also includes, for each node, an expandable structure showing computer grid applications running on a computer represented by the node, and an event handler configured to receive a request to view management services running on a computer and to generate a display showing the management services running on the computer.

In another aspect, the invention features a method that includes receiving a request to visualize a grid network with at least one node from a set of linked nodes, the nodes representing computers running grid managers and vectors representing relations between pairs of grid managers. The method also includes displaying the at least one node representing a grid manager, sending a first query to the grid manager requesting a first list of grid managers having an inferior relation to the root node, displaying nodes corresponding to the grid managers in the first list and drawing vectors from the grid manager to the grid managers in the first list of grid managers, sending a second query to the grid manager requesting a second list of grid managers having a superior relation to the grid manager, and displaying nodes corresponding to the grid managers in the second list and drawing vectors from the grid managers in the second list to the grid manager of the root node.

Embodiments may include the following. In some cases, the method further includes sending a third query to each of the grid managers in the first list of grid managers requesting a third list of grid managers having an inferior relation to each grid manager in the first list of grid managers, and displaying nodes representing grid managers in the third list of grid managers and drawing vectors from the grid managers in the second list of grid managers to grid managers in the third list of grid managers. In these cases, the method may further include recursively repeating the steps of sending and displaying for each of the grid managers in the third list. The method may also include sending a query to the grid manager, the query requesting a list of services and applications managed by the grid manager, and displaying an expandable structure, the display showing the list of services and applications managed by the grid manager.

These and other embodiments may have one or more of the following advantages. Using the GUI, a user can browse the landscape of a grid computing environment.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4A is a flow diagram for starting up an application in the computer device of FIG. 4.

Like reference symbols in the various drawings indicate like elements.

DETAILED DESCRIPTION

Figure 1:
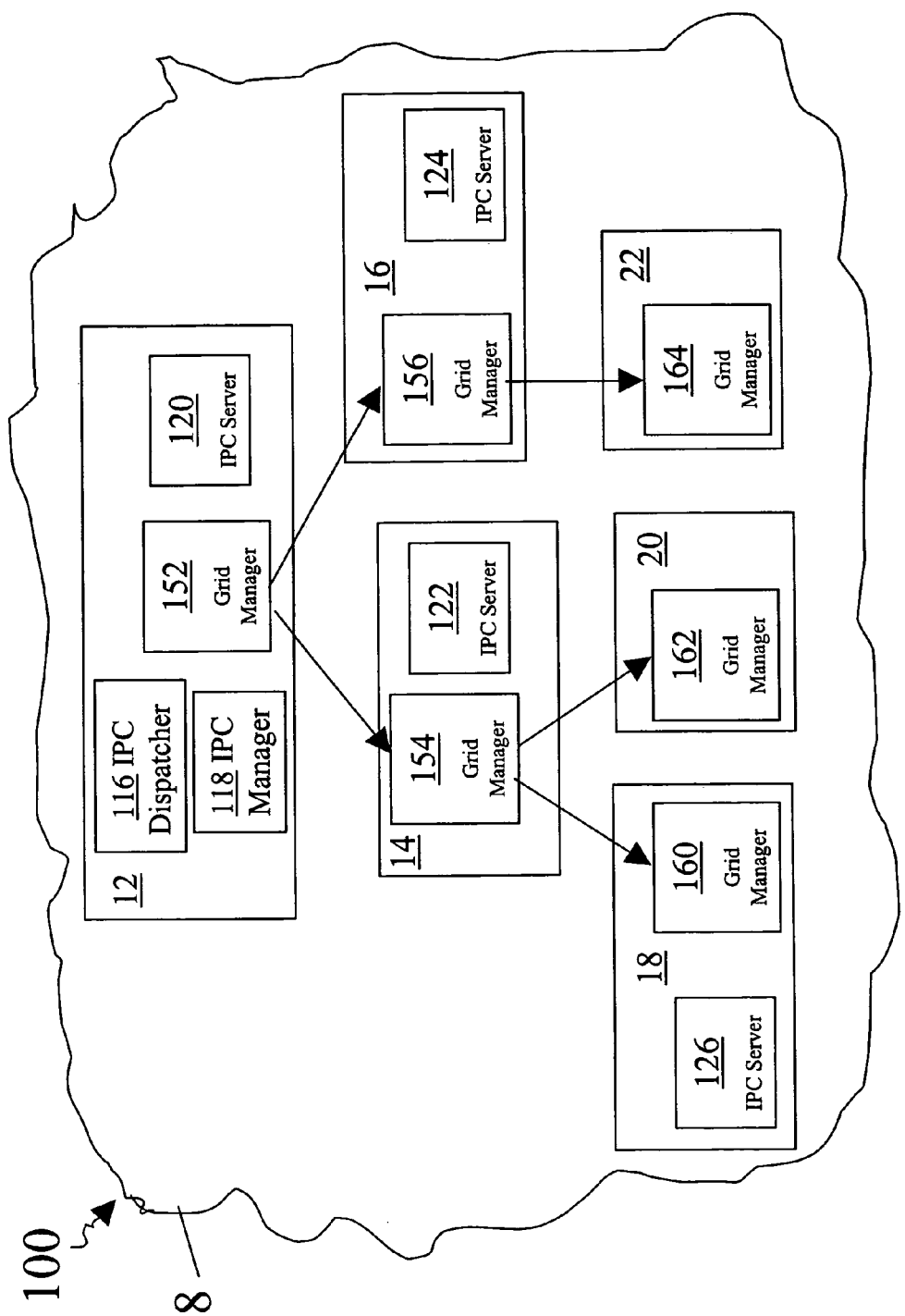
FIG. 1 is a block diagram of a grid computing environment.

As shown in FIG. 1, services in a grid computing environment 100 manage computational resources for applications. The grid computing environment 100 is a set of distributed computing resources that can individually be assigned to perform computing or data retrieval tasks for the applications. The computational resources include computer devices 12, 14, 16, 18, 20, and 22. The computer devices communicate using a network 8. The applications have scalable computational requirements. For example, an example application that uses computer devices 12, 14, 16, 18, 20, and 22 in the grid computing environment 100 is an internet pricing configurator. The computer device 12 provides network access to pricing information to users via web browsers on computer devices that are connected to the internet. The web browsers can be any application able to display content and/or execute applications such as web pages, media files, and programs, such as Netscape Navigator®, Microsoft Internet Explorer®, and similar applications.

In this example, a web server on computer device 12 provides pricing information to the users. Calculation parameters for each price to be calculated are passed by an IPC dispatcher 116 to IPC servers 120, 122, 124, and 126 that execute on computer devices 12, 14, 16, and 18, respectively. Due to the flexibility of the web server and applications on the internet, the number of users can vary. This generates dynamic computational requirements for the internet pricing configurator. An IPC manager 118 communicates with services in the grid computing environment 100 so that the services can allocate and deallocate computational resources (e.g., processors in computer devices 12, 14, 16, 18, 20, 22) based on the dynamic computational requirements of the internet pricing configurator. Allocating and deallocating computational resources in this manner allows computer devices 12, 14, 16, 18, 20, or 22 to be designated as general-purpose computational resources and not solely dedicated to handling peak demands of the internet pricing configurator application. The IPC manager 118 coordinates with the IPC dispatcher 116 so that the IPC dispatcher 116 has access to resources in network 8.

This capability to allocate and deallocate the resources in the grid computing environment 100 enables the IPC manager 118 to locate and use available computational resources on an "as needed" basis. Once resources are located, the IPC manager 118 can use services in the grid computing environment 100 to install the IPC servers 120, 122, 124, and 126 as applications on computer devices in the grid computing environment 100. The IPC dispatcher 116 uses Web Service Definition Language (WSDL) interfaces defined in the Open Grid Services Infrastructure (OGSI) Version 1.0 by Tuecke et al to manage and exchange the information flow between the IPC dispatcher 116 and IPC servers 120, 122, 124, and 126. For example, the OGSI WSDL interfaces can be used to pass computation parameters for pricing calculations from the IPC dispatcher 116 and the IPC servers 120, 122, 124, and 126. The OGSI WSDL interfaces can also be used to pass completed results from the IPC servers 120, 122, 124, and 126 back to IPC dispatcher 116. The OGSI Version 1.0 is incorporated herein by reference. The OGSI WSDL interfaces enable the controlled, fault-resilient, and secure management of the grid computing environment 100 and applications such as the internet pricing configurator.

While the IPC dispatcher 116 uses IPC servers 120, 122, 124, and 126 to perform calculations for users, services in the grid computing environment 100 monitor resource utilization on computer devices in the grid computing environment 100 running the IPC servers 120, 122, 124, and 126. The services also send this utilization information to the IPC manager 118. Based on a comparison between utilization requirements and current resource loading, the IPC manager 118 can dynamically inform services in the grid computing environment 100 to allocate more resources for IPC servers 120, 122, 124, and 126 or deallocate resources to keep utilization of resources in the grid computing environment 100 at a desired level.

Grid managers 152, 154, 156, 160, 162, and 164 are resident in computer devices 12, 14, 16, 18, 20, and 22, respectively. Within the grid computing environment 100, pairs of grid managers can have directional relations that classify one grid manager as superior to another grid manager. A grid manager can have more than one superior relations with other grid managers. For example, grid manager 152 has a superior relation with grid managers 154 and 156. A grid manager can also have more than one inferior relations with other grid managers. Through these hierarchical relations, IPC manager 118 does not need access to a list of all computer devices in network 8 to use the computational resources in the grid computing environment 100. IPC manager 118 is only required to have access to a network address of one computer device running a grid manager (e.g., computer device 12 running grid manager 152) and this grid manager uses its relations with other grid managers running on other computer devices to provide IPC dispatcher 116 with indirect access to other computer devices in the grid computing environment 100.

A grid manager (e.g., 152, 154, 156, 160, 162, and 164) maintains a first list of all superior relations with other grid managers and a second list of all inferior relations with other grid managers. Each grid manager maintains an "always open" communications channel to all the grid managers in these lists over network 8 using, for example, the aforementioned OGSI WSDL interfaces on transmission control protocol (TCP), hypertext transfer protocol (HTTP), and simple object access protocol (SOAP). These lists and corresponding communication channels can be modified, allowing a dynamic reconfiguration of the grid hierarchy during runtime. This also allows a failing grid manager to be dynamically replaced in the hierarchy. For example, referring to FIG. 1, if grid manager 154 fails, then grid manager 152 loses its connection to grid managers 160 and 162. In this case, relations between grid managers can be modified so that grid manager 152 has new superior relations to grid managers 160 and 162. Likewise, grid managers 160 and 162 have new inferior relations to grid manager 152.

Figure 2:
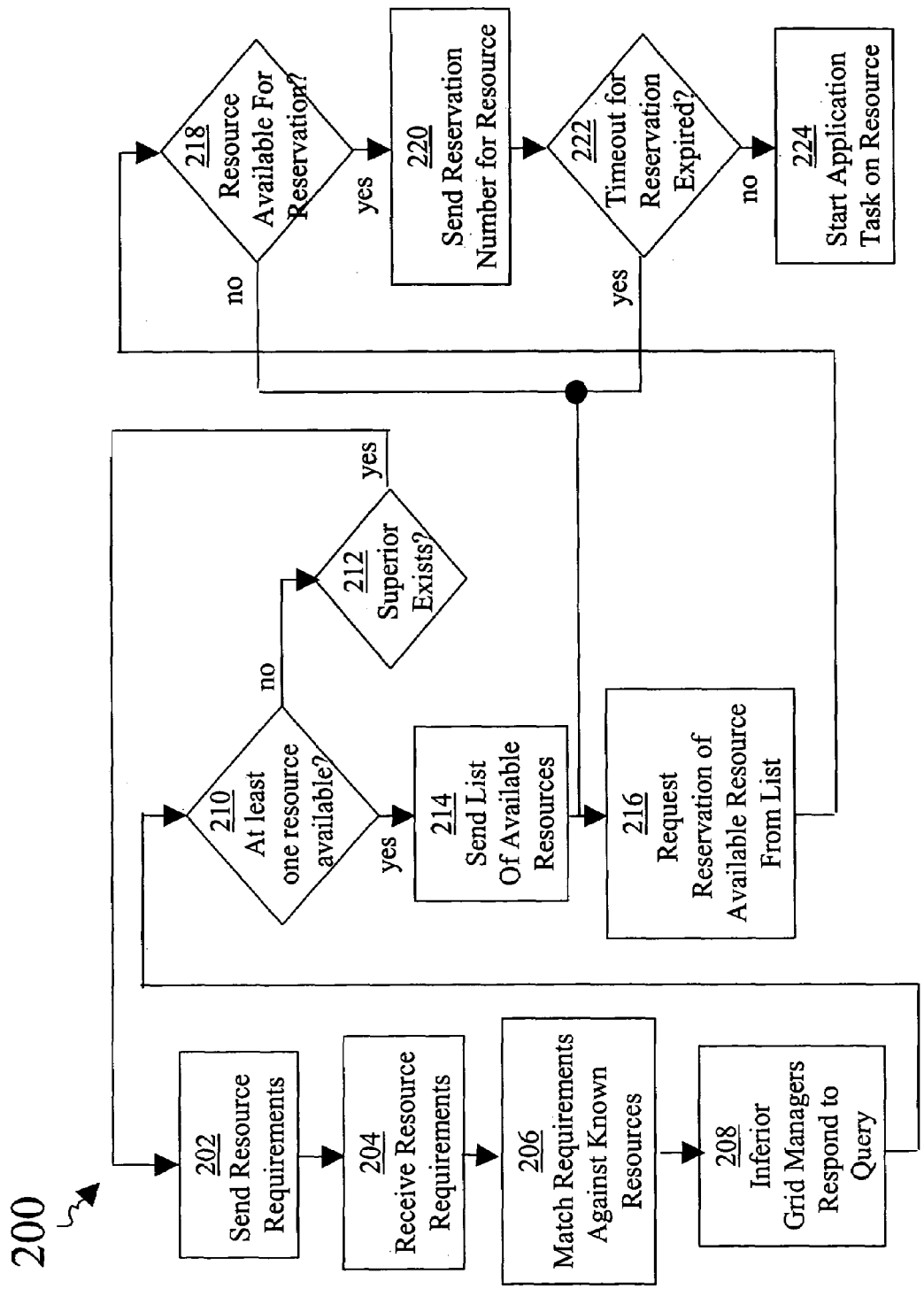
FIG. 2 is a flow diagram for discovering and reserving resources in the grid computing environment of FIG. 1.

As shown in FIG. 2, an application start process 200 is designed so applications (e.g., internet pricing configurator) get necessary resources allocated in the network 8 before executing on a computer device (e.g., 12, 14, 16, 18, 20, or 22). Process 200 also guarantees if similar applications are trying to start at the same time on the same resource on a computer device that the two or more applications do not collide or interfere with each other. For example, the IPC manager 118 can require that an IPC server (e.g., 120) be the only application executing on a processor in computer device 14 for quality of service (QoS). In this case, another application would interfere if the other application simultaneously attempted to execute on the processor in computer device 14.

Process 200 includes IPC manager 118 (or some other application) sending (202) requirements for computational resources to query a grid manager (e.g., 154) to determine if there are resources matching these requirements available in the grid computing environment 100. These requirements specify information pertaining to resources in a computer device such as required number of processors, required percentage of utilization for those processors, main memory, and network speed. The query can also include information to which hierarchy level (in the grid computing environment 100) the query should be propagated. Process 200 includes grid manager 154 receiving (204) the requirements.

To respond to the query for available resources from IPC manager 118, process 200 includes grid manager 154 matching (206) the requirements against resources known to grid manager 154. These resources include resources (e.g., processor 40) in computer device 14 that are directly managed by grid manager 154. Resources directly managed by grid manager 154 that are currently available and meet the requirements are added to a resource-query list maintained by grid manager 154.

Grid manager 154 also sends the query to grid managers 160 and 162 having inferior relations with grid manager 154. Process 200 includes grid managers 160 and 162 responding (208) to the query by sending to grid manager 154 lists of resources (e.g., processors on computer devices 18, 20) that meet the requested requirements and are available and known to grid managers 160 and 162, respectively. These resource-query lists of resources that are known to grid managers 160 and 162 can also include resources managed by grid managers (not shown) with inferior relations to grid managers 160 and 162. Grid manager 154 adds these resource-query lists of available resources from grid managers 160 and 162 to its resource-query list of available resources meeting the requested requirements. If process 200 determines (210) that there is at least one resource (e.g., processor 40) in this resource-query list, then grid manager 154 sends (214) this resource-query list to IPC manager 118. Otherwise, if process 200 determines (212) that grid manager 154 has a relation with a superior grid manager (e.g., grid manager 152), grid manager 154 sends (202) the query for available resources to grid manager 152. In response to this query, grid manager 152 does not send a redundant query back to grid manager 154 having an inferior relation with grid manager 152.

Process 200 includes grid manager 154 sending (214) the list of available resources along with addresses of their corresponding grid managers in the network 8 that match the requirements. The IPC manager 118 selects a resource (e.g., on computer device 16) from the list and requests (216) a reservation of the resource on computer device 16 to the grid manager 154 managing the resource on computer device 16. If the resource in computer device 16 is still available for reservation (218) and the reservation succeeds, grid manager 154 sends (220) a reservation number to the IPC manager 118. This reservation means that the IPC manager 118 is guaranteed and allocated the requested resource on the computer device 16 in the grid computing environment 100. The grid manager 154 handles queries for available resources from applications such as IPC manager 118 using independent processing threads of execution. Thus, the grid manager 154 uses a semaphore to ensure that the same resource (e.g., processor 40) is not assigned multiple reservation numbers for different applications simultaneously requesting the same resource.

If the grid manager determines that the requested resource in computer device 16 is not available for reservation and the reservation fails, the IPC manager 118 selects the next available resource in the list and requests (216) the reservation of this next available resource. If the IPC manager 118 receives a registration number and a timeout measured from the sending of the registration number does not expire (222), the IPC manager 118 starts (224) the IPC server 122 on the processor 40 resource in computer device 16. Starting the IPC server 122 is initiated by passing the reservation number and an application file to the grid manager 156 and then grid manager 156 reads the application file to install and execute the IPC server 122 on computer device 16.

Figure 3:
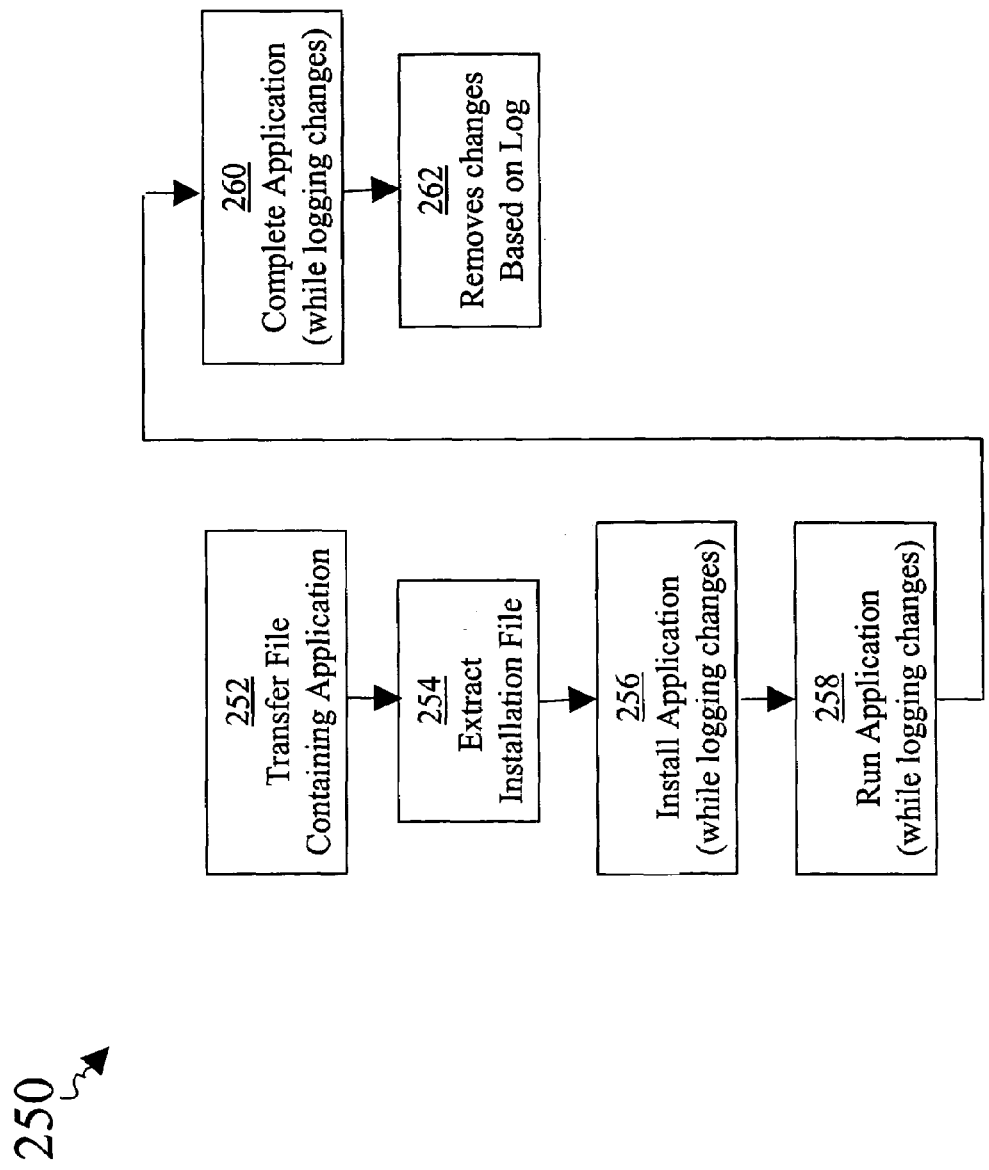
FIG. 3 is a flow diagram for installing, running, and removing applications in the grid computing environment of FIG. 1.

As shown in FIG. 3, process 250 installs an application (e.g., IPC server 122) on a computer device (e.g., 14) in the grid computing environment 100 to set up an available resource for the application, using the available resource, and removing or deinstalling the application to free up the resource for use by subsequent applications when the resource is no longer needed. Process 250 includes IPC manager 118 transferring (252) an application file containing code for IPC server 122 in addition to instructions on how to install, customize, track and remove the application from computer device 14 so that the grid manager 154 can return computer device 14 to an original state after executing the application.

IPC manager 118 transfers the application file using a file transfer protocol (FTP), hypertext transfer protocol (HTTP), or a file copy from a network attached storage (NAS) for example, to computer device 14 as a single file, such as a compressed zip file. Within this zip file there is information about installing and customizing the application IPC server 122. This information is represented by a small executable program or extended markup language (XML) document that is extracted and interpreted (254) by an installation and customizing engine (not shown) in grid manager 154. Process 250 includes grid manager 154 installing (256) and running (258) the application. During installation (256), customization and execution (258) of the application, all changes to the computer device 14 are logged so that when the application is terminated (260) or deinstalled by grid manager 154 upon request by IPC manager 118, grid manager 154 removes the application from the computer device 14 and also removes (262) any other changes to computer device 14 that were done when installing and running the application. Thus, the computer device 14 reverts to its original state prior to execution of the application and all of the resources of computer device 14 are again available for use by a subsequent application. This allows the resources to become available after running the application without rebooting computer device 14. These changes include space in memory (e.g., 32) allocated to store and run application code in addition to other changes such as allocation of communication ports.

In some examples, multiple applications can simultaneously run on resources in a single computer device (e.g., 14). Applications for the grid computing environment 100 are classified in part based on their resource requirements. Some changes to a computer device to run an application are only required for the first execution of an application of its class and subsequent executions do not require these changes. In these examples, grid manager 154 only does the changes for the first execution. Furthermore, when deinstalling the applications, grid manager 154 only removes the changes for the last application that was executed and terminated.

After installing applications on computer devices in the grid computing environment 100, grid managers are configured to start or stop the processes of these applications upon request. In the example of the internet pricing configurator (IPC) application, grid manager 154 is configured to start or stop IPC server 122 on computer device 14 after installing IPC server 122 on computer device 14. The IPC manager 118 requests grid managers to start or stop IPC servers in the grid computing environment 100 based on current utilization of resources in the grid computing environment 100. After stopping IPC server 122 on computer device 14, IPC manager 118 waits a prespecified amount of time and then requests grid manager 154 to deinstall IPC server 122 if current resource utilization does not indicate a need to start IPC server 122 again. Furthermore, as mentioned previously, grid managers monitor resource utilization on computer devices such as computer device 14 running applications (e.g. IPC servers 120, 122, 124, and 126) and send this utilization information to IPC manager 118.

In many examples, control of application processes on resources in a computer device is specific to the operating system (OS). The grid computing environment 100 is configured to handle different operating systems on computer devices. Furthermore, grid computing environment 100 is designed to handle different applications (e.g., internet pricing configurator) that do not have to be redesigned to execute on the grid computing environment 100. A grid manager controls an application process in a general manner that decreases interdependence between development of grid manager code and application code. An interface is provided to application code to enable grid managers to discover, control (e.g., start, stop, halt, resume) and inspect or monitor a state of application processes. The interface is provided for operating system processes that are exposed by the operating system or hosting environment and includes three aspects. One aspect of the interface is process data, such as process identification, states, degree of resource consumption (such as Central Processing Unit (CPU), memory, socket bindings, or other resources that an application can use), and application specific data defined by a process data scheme.

A second aspect of the interface is managing operations, such as start, stop, wait, resume, change priority, and other operations defined by supported managing operations.

A third aspect of the interface is control bindings and definitions, such as process data scheme, supported managing operations, and communication bindings. Since not all applications running in the grid computing environment 100 have access to the same information and capabilities in these three aspects, the applications provide to grid managers a list of queries and commands that each application supports.

The interface provided to application code is an Application Program Interface (API). The API is a set of methods (embedded in software code) prescribed by the grid manager software by which a programmer writing an application program (e.g., internet pricing configurator) can handle requests from the grid manager.

Figure 4:
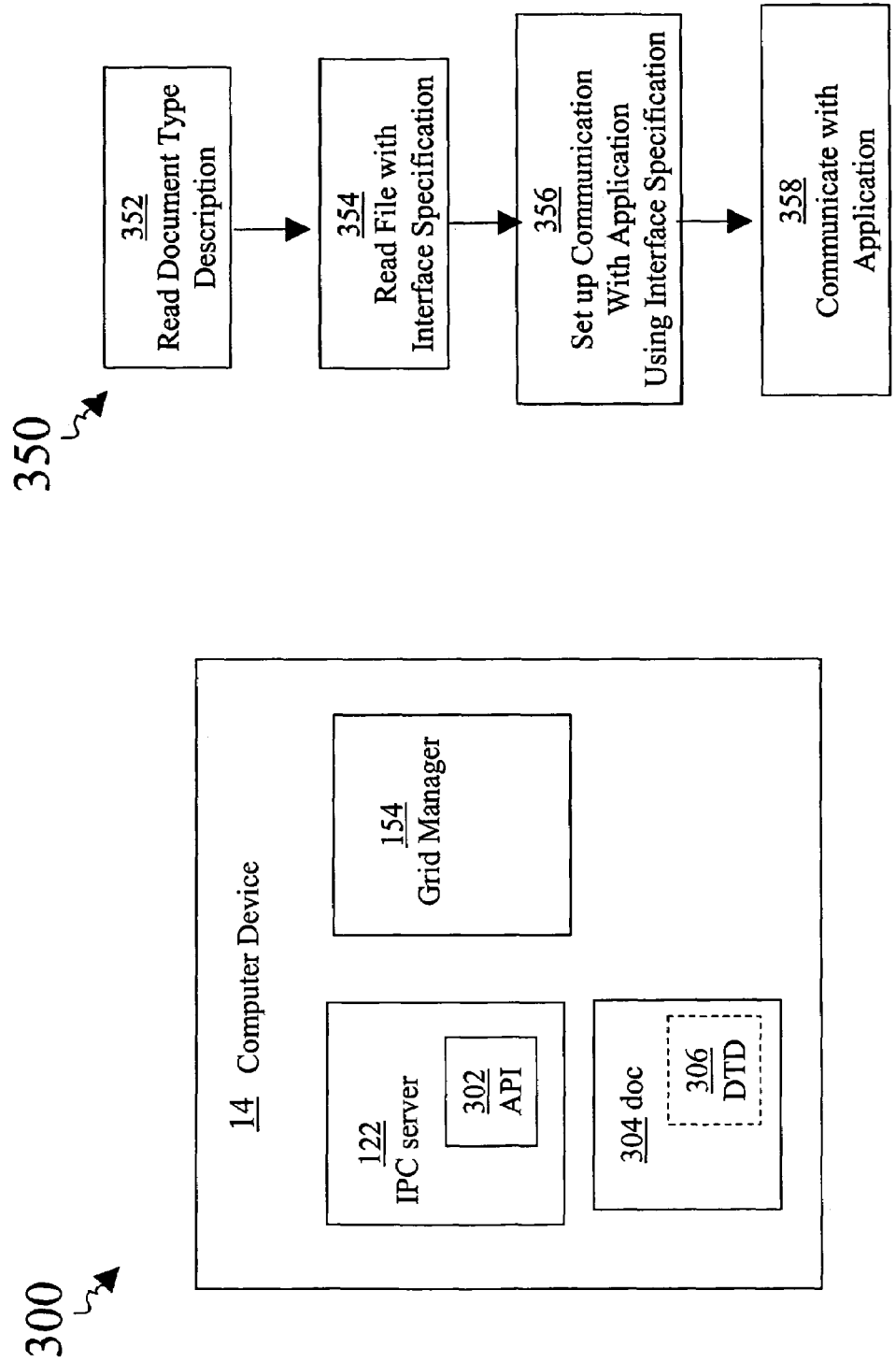
FIG. 4 is a block diagram of a computer device in the grid computing environment of FIG. 1.

As shown in FIG. 4, IPC server 122 includes an API 302 and a document 304. Since the API 302 is adapted to different types of applications, the document 304 describes how grid manager 154 communicates with the IPC server 122 and what requests through the API 302 are supported by the IPC server 122. Grid manager 154 reads document 304 before starting up IPC server 122. In some examples, document 304 is written in XML and includes a Document Type Description (DTD) 306. A DTD is a specific definition that follows the rules of the Standard Generalized Markup Language (SGML). A DTD is a specification that accompanies a document and identifies what the markups are that separate paragraphs, identify topic headings, and how each markup is to be processed. By including the DTD 306 with document 304, grid manager 154 having a DTD "reader" (or "SGML compiler") is able to process the document 304 and can correctly interpret many different kinds of documents 304 that use a range of different markup codes and related meanings.

As shown in FIG. 4A, grid manager 154 uses process 350 to install applications such as IPC server 122. Grid manager 154 reads (352) DTD 306 in document 304 to identify markups in document 304. Grid manager 154 reads (354) document 304 using markups to identify communication parameters for communicating with IPC server 122. Grid manager 154 sets up (356) communications with IPC server 122 based on the specifications of the communication parameters. Grid manager 154 communicates (358) with IPC server 122 using the communication parameters to send requests such as "Start", "Stop", and "Are you idle?".

Figure 5:
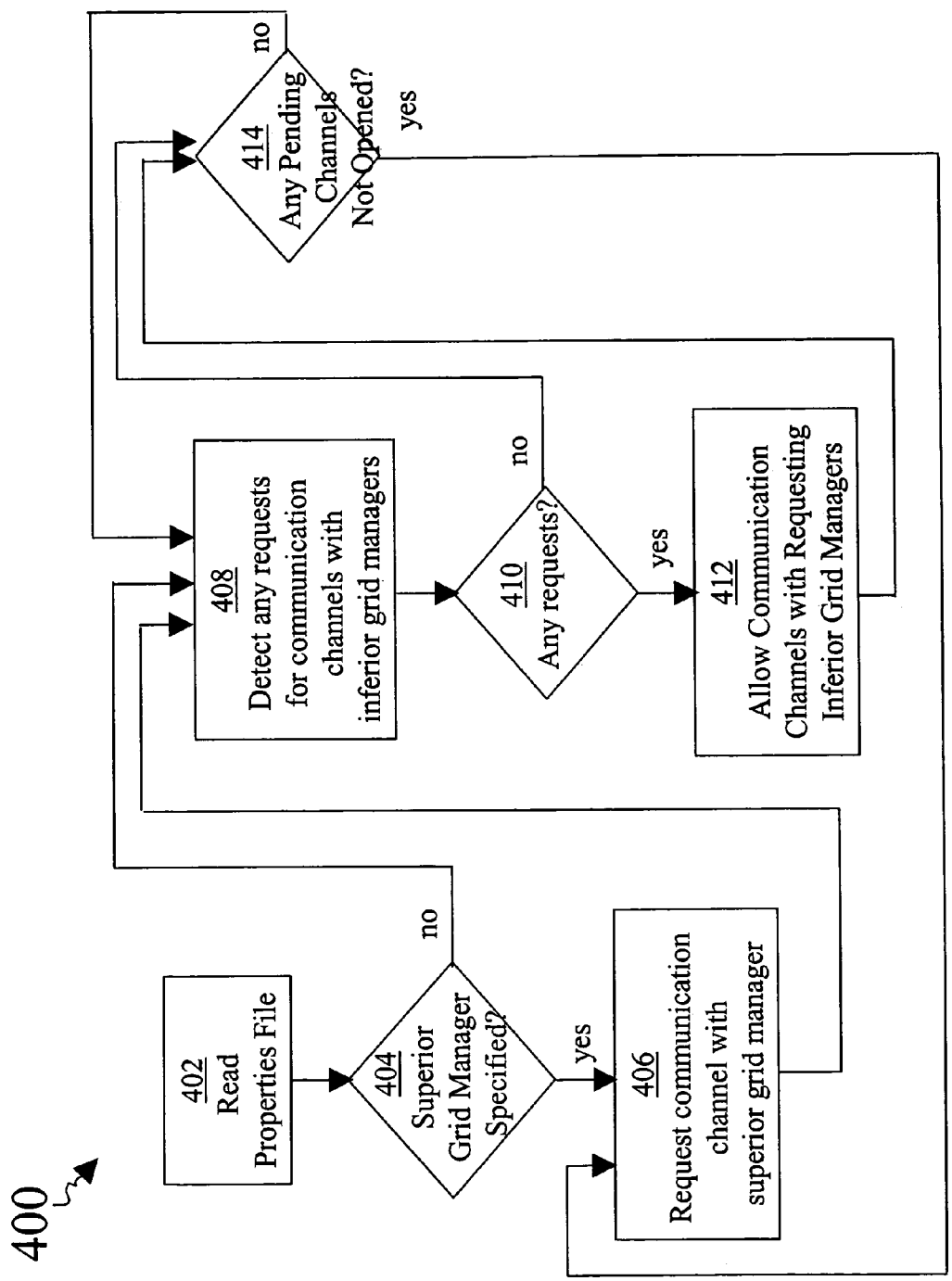
FIG. 5 is a flow diagram for starting up grid managers in the grid computing environment of FIG. 1.
Figure 5A:
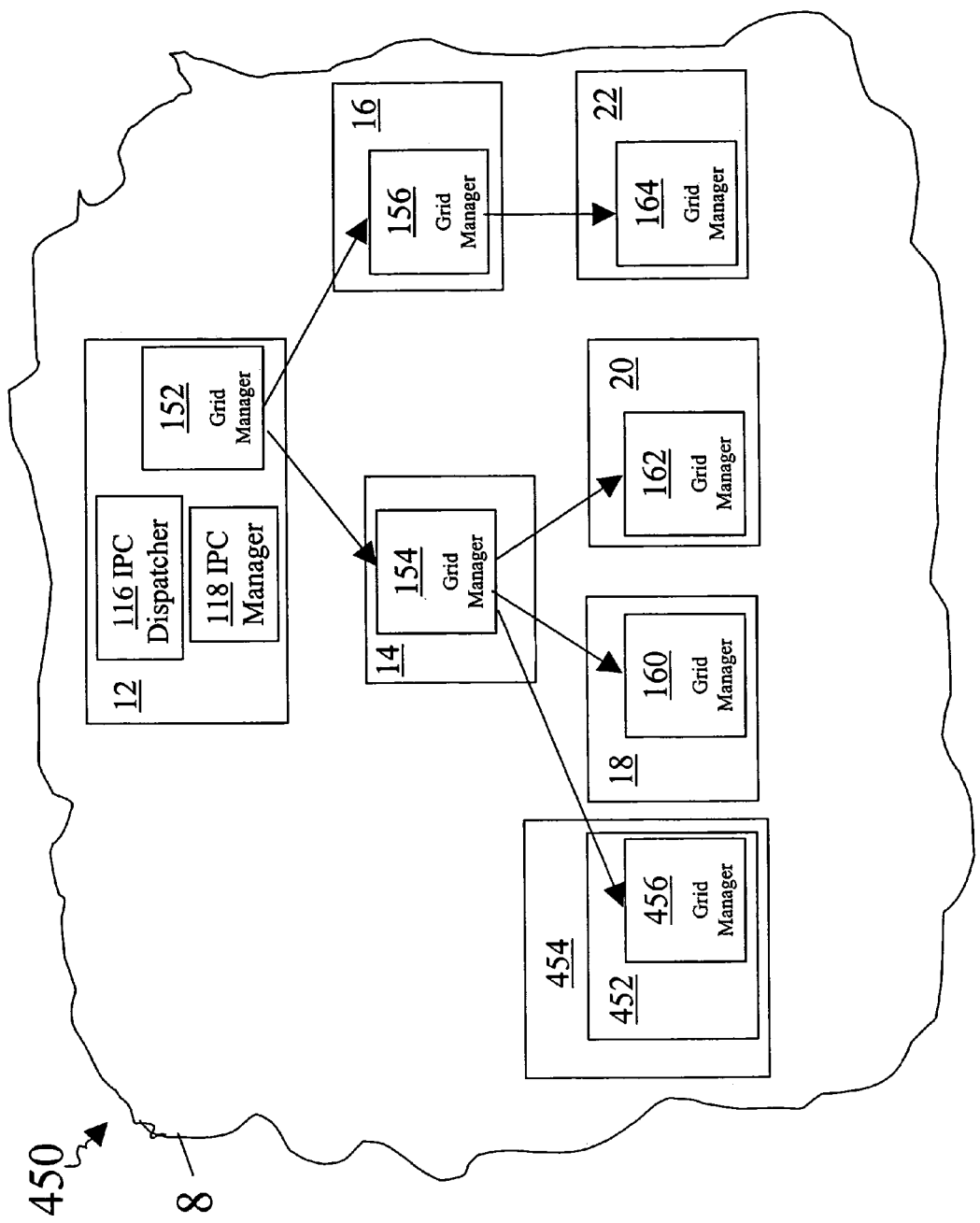
FIG. 5A is a block diagram of the grid computing environment of FIG. 1 that is augmented with another computer device.

Before any applications (e.g., internet pricing configurator) can be executed on network 8, grid managers 152, 154, 156, 160, 162, and 164 are asynchronously started up on computer devices 12, 14, 16, 18, 20, and 22, and relations to other grid managers are established. As shown in FIG. 5, process 400 initializes relations among grid managers. For each grid manager (e.g., grid manager 154), the grid manager 154 starts up on computer device 14 by reading (402) a properties file. The properties file contains a list of addresses of computer devices with grid managers having superior relations to grid manager 154. This list was described earlier as a first list of all superior relations with other grid managers. If (404) a superior grid manager (e.g., grid manager 152) is specified in this list of addresses, grid manager 154 requests (406) to open a communication channel to the superior grid manager (e.g., 152). If grid manager 152 is already started, then grid manager 152 responds by accepting the request of the opening of the communication channel from grid manager 152. Process 400 includes grid manager 154 detecting (408) any requests for communication channels from grid managers (e.g., grid managers 160, 162) identified as having inferior relations with grid manager 154. If process 400 determines (410) that there are some requests, grid manager 154 allows communication channels from the inferior grid managers (e.g., 160, 162). Process 400 includes grid manager 154 checking (414) if there are any pending requests for communication to grid managers having superior relations. If there are any pending requests, grid manager 154 requests (406) communication channels to grid managers. These communication channels are used for resource queries between grid managers (as described previously) and "heart beat" messages between grid managers to ensure that each grid manager in the grid computing environment 100 is functioning.

Once grid managers 152, 154, 156, 160, 162, and 164 are running with established relations, the grid managers are used for the proper operation of the grid computing environment 100. Often during the lifecycle of the grid computing environment 100 the functionality of the grid managers are enhanced. It is often not possible or convenient to shut down the grid computing environment 100 and start the grid computing environment 100 up with the enhancements. Grid managers 152, 154, 156, 160, 162, and 164 are configured so that there is only a minimal impact on users of the grid computing environment 100 when a change happens. To enable this transparency, an API is provided for user interfaces to enable an administrator of grid computing environment 100 to access each of the grid managers 152, 154, 156, 160, 162, and 164 individually or all together. The API is static in that it includes only one method, i.e., a string that contains a command typed by the administrator. The API is dynamic because the string can contain many different commands.

In some cases, the grid managers are developed using the Java programming language. In these cases, new commands issued to the grid managers can be supported by loading new or revised Java classes dynamically via classloaders. This dynamic access to code can be done without shutting down grid managers in the grid computing environment 100. Using Java classloaders, each time an instance of a class for a grid manager is generated, the definition and behavior of the class can be updated to provide new functionality to the grid computing environment 100.

Another way to modify the functionality of the grid computing environment 100 dynamically without shutting down the grid computing environment 100 is to change the hierarchical relations between grid managers, remove grid managers, or add new grid managers. The API provided for administration of the grid computing environment 100 is also configured to send strings to individual grid managers with commands to delete existing relations or add new relations.

Figure 6:
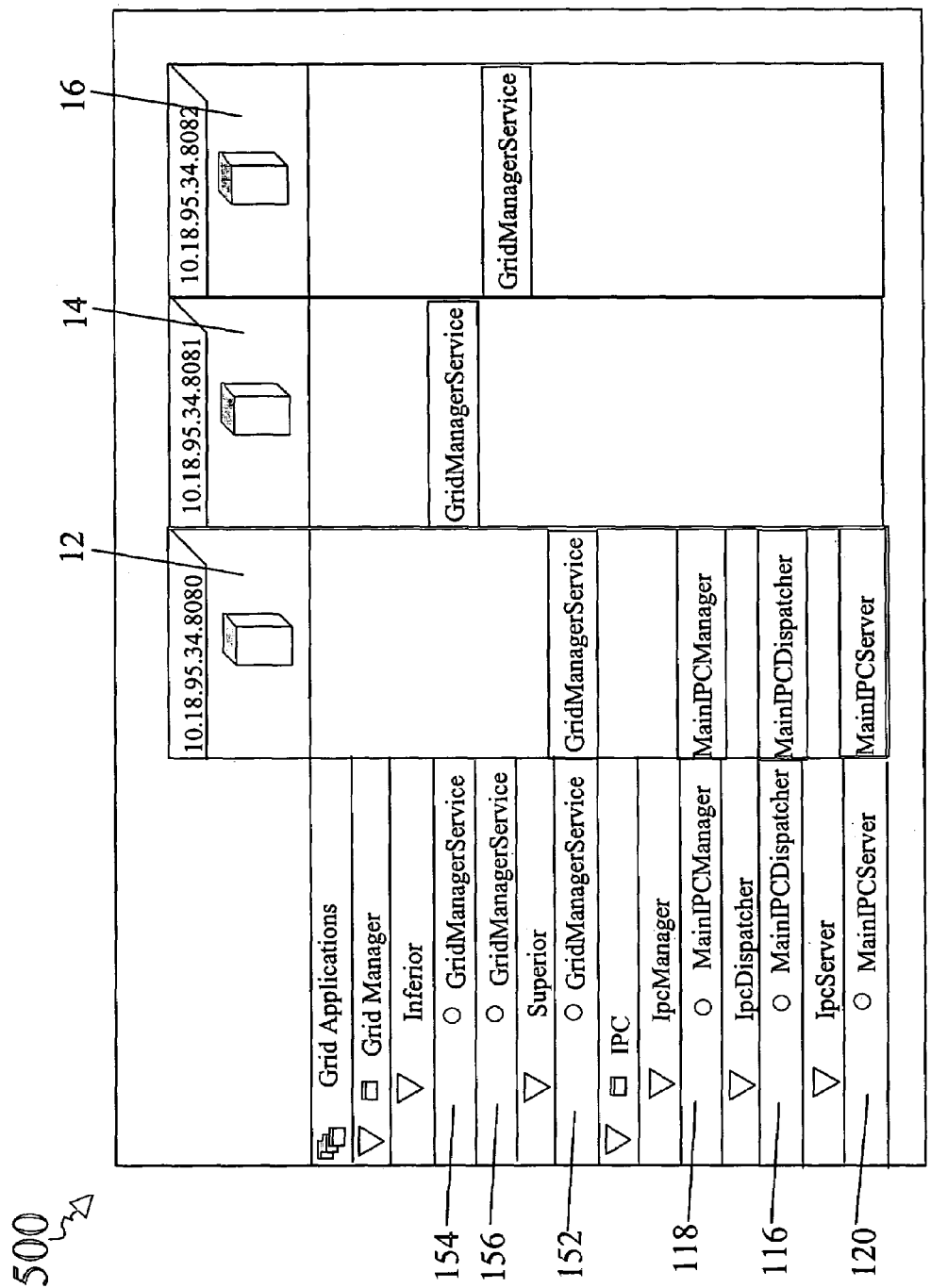
FIG. 6 is a block diagram of an exemplary a grid graphical user interface (GUI) component for visualization of a grid computing environment.

For administrators of grid computing environment 100, it is useful to visualize the applications and a grid manager on one computer device in the grid computing environment 100 as well as other computer devices running part of the grid management hierarchy in the form of grid managers with one or more levels of inferior relations to the grid manager. The view of these computer devices is referred to as a grid landscape. As shown in FIG. 6, a grid graphical user interface (GUI) 500 for visualization of a grid landscape, such as the grid computing environment 100, includes GUI-elements visualizing an organization of services running on computer devices. The GUI 500 provides a grid-like structure with columns and rows. Rows represent services, which in turn are structured hierarchically with respect to the application where a service belongs to, the type of the service, and the specific service instances. Each service instance row is associated with a place in the grid computing environment 100 representing where it is instantiated. In this context, columns represent the computer devices in the grid landscape. Specifically, GUI 500 has three columns representing three computer devices 12, 14, and 16. GUI 500 shows that grid manager 152 runs on computer device 12 with inferior grid managers 154, and 156 running on computer devices 14 and 16, respectively. GUI 500 also shows internet pricing configurator services running on computer device 12. These internet pricing configurator services include IPC dispatcher 116, IPC server 120, and IPC manager 118.

The GUI 500 is dynamically refreshed with feedback from the grid managers and internet pricing configurator (or other application) services so that new services appear in GUI 500 to an administrator. Similarly, services that are shut down are removed in GUI 500.

Figure 7:
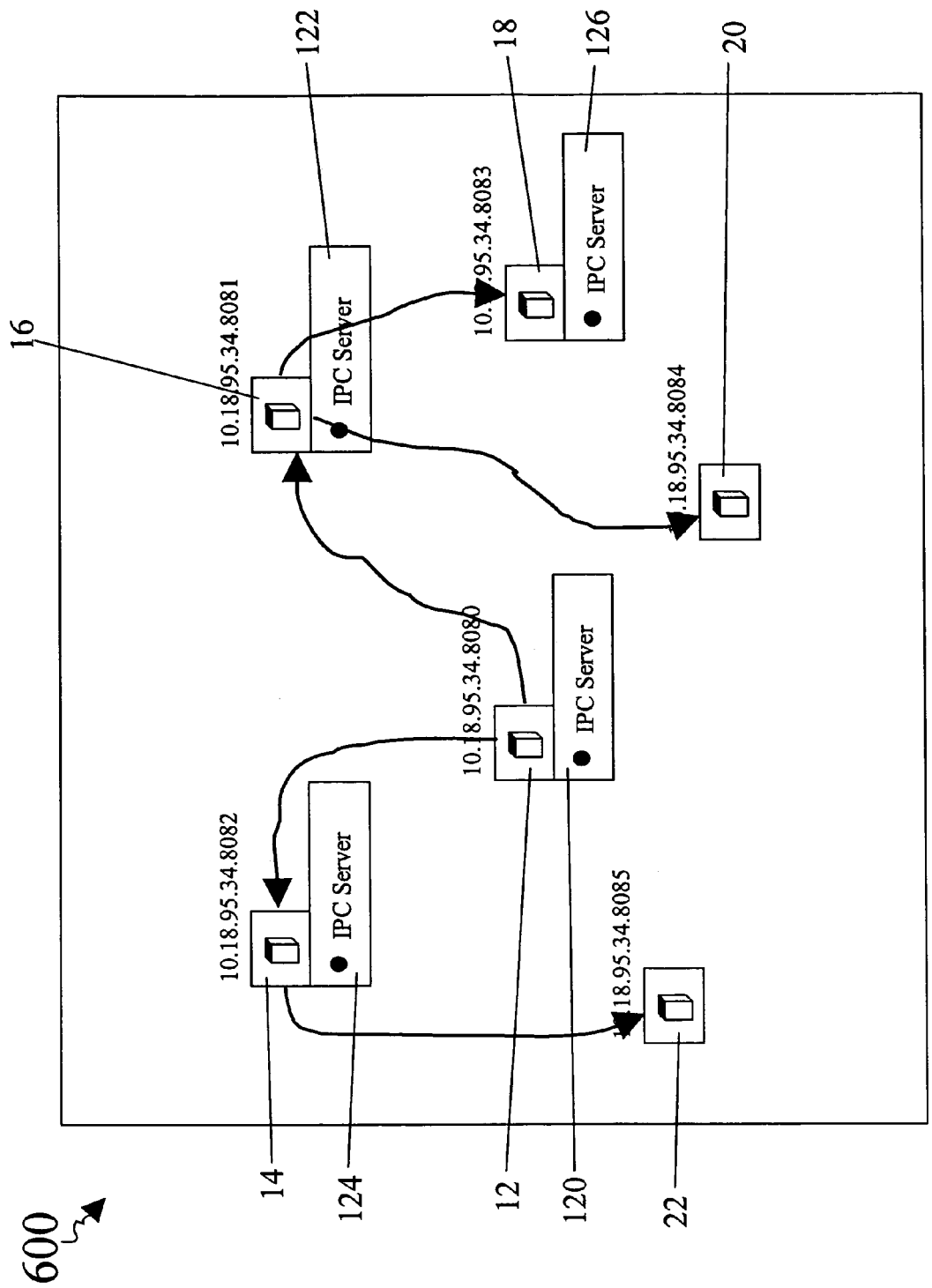
FIG. 7 is a block diagram of a grid browser component.

As shown in FIG. 7, a grid browser component 600 is a composite graphical user interface (GUI) for browsing grid managers on computer devices in the grid computing environment 100. The component 600 displays a graph with curved edges and vertices. Vertices represent computer devices in the grid computing environment 100 and curved edges represent the directional association of grid managers on two computer devices (vertices) in the grid computing environment 100. This association is hierarchical (i.e., superior/inferior). Each vertex displays the network address of a computer device as well as applications currently running on the computer device. For example, component 600 shows computer devices 12, 14, 16, 18, 20, and 22 with IPC servers 118, 120, 122, and 124. In other examples (not shown), the grid browser component 600 shows non-hierarchical, peer to peer associations of grid managers with non-directional edges representing the associations.

The grid browser component 600 is context sensitive. Depending on the relationship among the grid managers on the computer devices (e.g., superior/inferior), computer devices are traversed in respect to a user's browsing history.

By clicking on a vertex representing a computer device in GUI 600 (e.g., computer device 14), a user can automatically view a grid manager and applications running on the computer device and grid managers having inferior relations to the grid manager using GUI 500. The user can pick a computer device and see relations between its grid manager and other grid managers. This connection between GUIs 500 and 600 is done using software that generates GUIs 500 and 600.

The network 8 can be implemented in a variety of ways. The network 8 includes any kind and any combination of networks such as an Internet, a local area network (LAN) or other local network, a private network, a public network, a plain old telephone system (POTS), or other similar wired or wireless networks. Communications through the network 8 may be secured with a mechanism such as encryption, a security protocol, or other type of similar mechanism. Communications through the network 8 can include any kind and any combination of communication links such as modem links, Ethernet links, cables, point-to-point links, infrared connections, fiber optic links, wireless links, cellular links, Bluetooth®, satellite links, and other similar links.

The network 8 is simplified for ease of explanation. The network 8 can include more or fewer additional elements such as networks, communication links, proxy servers, firewalls or other security mechanisms, Internet Service Providers (ISPs), gatekeepers, gateways, switches, routers, hubs, client terminals, and other elements.

Computer devices 12, 14, 16, 18, 20, and 22 communicate over medium 10 using one of many different networking protocols. For instance, one protocol is Transmission Control Protocol/Internet Protocol (TCP/IP) combined with SOAP (Simple Object Access Protocol).

Embodiments of the invention can be implemented in digital electronic circuitry, or in computer hardware, firmware, software, or in combinations of them. Embodiment of the invention can be implemented as a computer program product, i.e., a computer program tangibly embodied in an information carrier, e.g., in a node-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of embodiments of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Other embodiments are within the scope of the following claims.

What is claimed is:

1. A computer-readable storage device comprising instructions for causing a processor to:
   receive a request to visualize a grid network, the grid network comprising grid managers for managing computational resources on a plurality of computers functioning as grid nodes, the grid managers operating to route resource requests throughout the grid network, the resource requests being requests for the computational resources from the computers in the grid network; and
   generate, in response to the request, a display comprising:
   a graph with directional edges and vertices, the vertices representing the grid nodes in the grid network and the directional edges representing hierarchical associations between superior grid managers and inferior grid managers, the superior grid managers routing the resource requests to the inferior grid managers to request the computational resources on the inferior grid managers,
   wherein the directional edges indicate the routing of the resource requests from the superior grid managers to request the computational resources on the inferior grid managers.

2. The computer-readable storage device of claim 1 in which the association is peer-to-peer.

3. The computer-readable storage device according to claim 1, wherein the vertices display a network address for the corresponding grid node.

4. The computer-readable storage device according to claim 1, wherein the vertices display applications currently running on the corresponding grid node.

5. The computer-readable storage device according to claim 1, further comprising instructions for causing the processor to generate, in response to user input identifying one of the grid nodes, a display of a grid manager running on the identified grid node.

6. The computer-readable storage device according to claim 1, further comprising instructions for causing the processor to generate, in response to user input identifying one of the grid nodes, a display of applications running on the identified grid node.

7. The computer-readable storage device according to claim 1, further comprising instructions for causing the processor to generate, in
   displaying nodes corresponding to the grid managers in the superior grid manager list and drawing a second group of vectors directed from the superior grid managers to the first grid manager, the second group of vectors indicating that the resource requests in the grid network are routed from the superior grid managers to request computational resources from the first grid manager before being routed to the inferior grid managers by the first grid manager.

8. The computer-readable storage device according to claim 1, wherein:
   the grid managers comprise at least a first tier of grid managers, a second tier of grid managers, and a third tier of grid managers, the first tier of grid managers being superior to the second tier of grid managers, and the second tier of grid managers being superior to the third tier of grid managers, and
   the directional edges indicate that resource requests are routed within the grid network from the first tier of grid managers to the second tier of grid managers, and subsequently from the second tier of grid managers to the third tier of grid managers.

9. A computer-readable storage device comprising instructions for causing a processor to perform a method, the method comprising:
   displaying a first graphical user interface (GUI), the first GUI comprising:
   a graph with vectors and nodes for visualizing a computer grid, the nodes representing computers running grid managers and the vectors representing relations between superior grid managers and inferior grid managers, the vectors pointing from the superior grid managers to the inferior grid managers to indicate routing of resource requests from the superior grid managers to request computational resources from the inferior grid managers, and
   for each node, an expandable structure showing computer grid applications running on a computer represented by the node;
   receiving, with an event handler, a request identifying one of the nodes in the first GUI; and
   displaying a second GUI in response to the request, the second GUI illustrating the grid manager running on the identified node and an inferior grid manager on a node other than the identified node.

10. A method comprising:
    receiving a request to visualize a grid network with a first node representing a first grid manager from a set of linked nodes, the linked nodes representing computers running grid managers and vectors representing relations between pairs of grid managers;

displaying the first node representing the first grid manager;

sending a first query to the first grid manager requesting an inferior grid manager list of inferior grid managers having an inferior relation to the first grid manager;

receiving a first response from the first grid manager to the first query, the first response including the inferior grid manager list;

displaying nodes corresponding to the grid managers in the inferior grid manager list and drawing a first group of vectors directed from the first grid manager to the inferior grid managers, the first group of vectors indicating that resource requests in the grid network are routed from the first grid manager to request computational resources from the inferior grid managers;

sending a second query to the first grid manager requesting a superior grid manager list of superior grid managers having a superior relation to the first grid manager;

receiving a second response from the first grid manager to the second query, the second response including the superior grid manager list; and displaying an expandable structure, the display showing the list of services and applications managed by the first grid manager.

11. The method of claim 10 further comprising:

sending a third query to each of the grid managers in the first list of grid managers requesting a third list of grid managers having an inferior relation to each grid manager in the first list of grid managers;

displaying nodes representing grid managers in the third list of grid managers and drawing vectors from the grid managers in the second list of grid managers to grid managers in the third list of grid managers.

12. The method of claim 11 further comprising:

recursively repeating the steps of sending and displaying for each of the grid managers in the third list.

13. The method of claim 10 further comprising:

sending a query to the first grid manager, the query requesting a list of services and applications managed by the first grid manager; and response to user input identifying one of the grid nodes, a display representing a relationship between a grid manager running on the identified grid node and a grid manager running on another one of the grid nodes.

14. A computer comprising:

a processor; and a memory storing instructions for causing the processor to:
receive a request to visualize a grid network, the grid network comprising grid managers for managing computational resources on a plurality of computers functioning as grid nodes, the grid managers operating to route resource requests throughout the grid network, the resource requests being requests for the computational resources from the computers in the grid network; and generate, in response to the request, a display comprising:

a graph with directional edges and vertices, the vertices representing the grid nodes in the grid network and the directional edges representing hierarchical associations between superior grid managers and inferior grid managers, the superior grid managers routing the resource requests to the inferior grid managers to request the computational resources on the inferior grid managers, wherein the directional edges indicate the routing of the resource requests from the superior grid managers to request the computational resources on the inferior grid managers.

15. A computer comprising:

a processor; and a memory storing instructions for causing the processor to:
display a first graphical user interface (GUI), the first GUI comprising:

a graph with vectors and nodes for visualizing a computer grid, the nodes representing computers running grid managers and the vectors representing relations between superior grid managers and inferior grid managers, the vectors pointing from the superior grid managers to the inferior grid managers to indicate routing of resource requests from the superior grid managers to request computational resources from the inferior grid managers, and for each node, an expandable structure showing computer grid applications running on a computer represented by the node; and receive, with an event handler, a request identifying one of the nodes in the first GUI; and display a second GUI in response to the request, the second GUI illustrating the grid manager running on the identified node and an inferior grid manager on a node other than the identified node.

16. A computer-readable storage device comprising instructions for causing a processor to:

receive a request to visualize a grid network with a first node representing a first grid manager from a set of linked nodes, the linked nodes representing computers running grid managers and vectors representing relations between pairs of grid managers;

display the first node representing the first grid manager;

send a first query to the first grid manager requesting an inferior grid manager list of inferior grid managers having an inferior relation to the first grid manager;

receive a first response from the first grid manager to the first query, the first response including the inferior grid manager list;

display nodes corresponding to the grid managers in the inferior grid manager list and drawing a first group of vectors directed from the first grid manager to the inferior grid managers, the first group of vectors indicating that resource requests in the grid network are routed from the first grid manager to request computational resources from the inferior grid managers;

send a second query to the first grid manager requesting a superior grid manager list of superior grid managers having a superior relation to the first grid manager;

receive a second response from the first grid manager to the second query, the second response including the superior grid manager list; and display nodes corresponding to the grid managers in the superior grid manager list and drawing a second group of vectors directed from the superior grid managers to the first grid manager, the second group of vectors indicating that the resource requests in the grid network are routed from the superior grid managers to request computational resources from the first grid manager before being routed to the inferior grid managers by the first grid manager.

* * * * *